(12) United States Patent
Xu et al.

(10) Patent No.: US 8,541,095 B2
(45) Date of Patent: Sep. 24, 2013

(54) SECURITY FILM AND PROCESS FOR PREPARATION THEREOF

(75) Inventors: Liangheng Xu, Shanghai (CN); Kai Yang, Shanghai (CN)

(73) Assignee: Shanghai Techsun Anti-Counterfeiting Technology Holding Co., Ltd., Shanghai (CN)

( * ) Notice: Subject to any disclaimer, the term of this patent is extended or adjusted under 35 U.S.C. 154(b) by 171 days.

(21) Appl. No.: 13/055,313

(22) PCT Filed: Jul. 29, 2008

(86) PCT No.: PCT/CN2008/071794
§ 371 (c)(1),
(2), (4) Date: Apr. 18, 2011

(87) PCT Pub. No.: WO2010/009593
PCT Pub. Date: Jan. 28, 2010

(65) Prior Publication Data
US 2011/0293858 A1    Dec. 1, 2011

(30) Foreign Application Priority Data
Jul. 24, 2008    (CN) .......................... 2008 1 0040893

(51) Int. Cl.
| | |
|---|---|
| B42D 15/00 | (2006.01) |
| B32B 3/00 | (2006.01) |
| B44F 1/00 | (2006.01) |
| G02B 5/00 | (2006.01) |
| B29D 11/00 | (2006.01) |

(52) U.S. Cl.
USPC ............... 428/199; 428/29; 428/354; 283/72; 359/529; 359/530; 359/536; 359/538; 359/540; 264/1.9

(58) Field of Classification Search
USPC ............ 283/72; 428/29, 199, 354; 359/529, 359/536, 538, 540; 264/1.9
See application file for complete search history.

(56) References Cited

U.S. PATENT DOCUMENTS

| | | | |
|---|---|---|---|
| 4,037,007 | A | 7/1977 | Wood |
| 5,726,803 | A | 3/1998 | Ochi et al. |

(Continued)

FOREIGN PATENT DOCUMENTS

| | | |
|---|---|---|
| CN | 101116015 | 1/2008 |
| EP | 1457349 | 9/2004 |

(Continued)

OTHER PUBLICATIONS

European Search Report dated Jul. 6, 2011, for corresponding patent application No. PCT/CN2008/071794.

(Continued)

*Primary Examiner* — Mark Ruthkosky
*Assistant Examiner* — Laura C Dettinger
(74) *Attorney, Agent, or Firm* — K&L Gates LLP

(57) ABSTRACT

Disclosed herein are an anti-counterfeiting film and process for preparation thereof. The anti-counterfeiting film comprises a directional retroreflective layer (1), an optical-angle-based color-changing information layer (2), a reflective layer (3) and a support layer (4) which are combined in this turn. The support layer (4) is made of a polymer resin material, the reflective layer (3) is made of a material with high reflectivity and has a thickness of nanoscale, the information layer (2) is made of an optical-angle-based color-changing chiral polymer material having a helical structure or made of an optical-angle-based color-changing cellulose material. The optical-angle-based color-changing chiral polymer material having a helical structure is a condensation product of a chiral compound and a compound with functional group. The optical-angle-based color-changing cellulose material is composed of a cellulose derivative and a polymerisable monomer. The directional retroreflective layer (1) is composed of spheres which are made of optical material, and is spherically embedded in the support layer (4), wherein the refractive index of the material for the directional retroreflective layer (1) is 1.9-1.93.

10 Claims, 2 Drawing Sheets

(56) References Cited

U.S. PATENT DOCUMENTS

2002/0055555 A1    5/2002    Kuntz et al.
2008/0226906 A1    9/2008    Nomura et al.

FOREIGN PATENT DOCUMENTS

| EP | 1457349 A1 * | 9/2004 |
|---|---|---|
| EP | 1742090 | 1/2007 |

OTHER PUBLICATIONS

International Search Report dated Apr. 13, 2009, for corresponding patent application No. PCT/CN2008/071794.

* cited by examiner

SECURITY FILM AND PROCESS FOR PREPARATION THEREOF

TECHNICAL FIELD

The present invention relates to an anti-counterfeiting film in the anti-counterfeiting field and a process for preparation thereof, the film has a characteristic of viewing-angle-based color change under the condition of directional retroreflection.

BACKGROUND ART

In early nineties of the 20$^{th}$ century, an optical-angle-based color-changing anti-counterfeiting product appeared in foreign countries, i.e. notable color change occurs to patterns along with the change of viewing angle. This type of product has characteristics of being a leading technology, being liable to be distinguished, a high security and being convenient for identification. Thereby, said technology has become one of the widely used technologies by authoritative organizations of public security of countries in global. Currently, this technology has been successfully applied to many fields such as countries' currency and certificate (e.g. rmb, dollar, euro, foreign passport, driving license). However, regarding the traditional optical-angle-based color-changing anti-counterfeiting product, for example, optically variable ink OVI, optically variable hologram film and the like, the optically variable effect of the material thereof is achieved by the technology of pigment interference, optical coating or laser etching. Thereby, the product has the defects of non-perspective, a long technique route, a difficulty in combination of different technologies, and a high price, which have greatly limited the application scopes of the traditional anti-counterfeiting product.

A novel optical-angle-based color-changing material can selectively reflect lights having a special wavelength via a helical structure in the material, thus macroscopically exhibits an effect of optical-angle-based color change, and, this type of material is a transparent material. At present, this type of optical-angle-based color-changing material includes optical-angle-based color-changing chiral polymer material (e.g. CN03114913.8), optical-angle-based color-changing cellulose material (e.g. CN02136974.7) and so on.

The technology of directional retroreflection belongs to a physical optical technology and was earlier developed by Chinese American scientist Dr. DONG Qifang in fifties of 20$^{th}$ century. The major technical principle is: when a parallel light beam irradiates a surface having special structure from a certain angle, a comparatively large part of light reflects in parallel light beam towards incident direction of light source. The ray passes through incidence-refraction-reflection course and forms a directional retroreflective characteristic, generating particular reflection effect. With the development of automobile industry and road traffic, a series of reflective materials based on this technical principle are widely used, and, more and more technologies relating to structure design and manufacturing method of the reflective materials are patented, for example, the U.S. Pat. No. 4,721,649.

However, the above anti-counterfeiting technologies about optical-angle-based color change have similar effects, and lack technical concealment; application of the technology of directional retroreflection is currently limited to road traffic and the like field. Thus, the present invention studies a combination of the technology of directional retroreflection with the technology of optical-angle-based color change, and develops novel anti-counterfeiting film that has special visual effect to meet requirements of advanced anti-counterfeiting field.

SUMMARY OF THE INVENTION

The object of the present invention is to provide an anti-counterfeiting film and a process for preparation thereof to overcome the defects of having similar effects and lacking technical concealment existing in the prior art to meet requirements of development of relevant fields.

The anti-counterfeiting film of the present invention comprises a directional retroreflective layer, an optical-angle-based color-changing information layer, a reflective layer and a support layer which are combined in this turn;

The support layer is made of a polymer resin material featuring a high transmittance, a good weatherability and a high toughness; preferable polymer resin material is polyurethane, phenolic resin or polyacrylic acid resin;

The reflective layer has a thickness of nanoscale (20-100 nm) and is made of a material with high reflectivity, preferably ZnO, SnO, ZnS or TiO$_2$ and the like;

The optical-angle-based color-changing information layer is made of an optical-angle-based color-changing chiral polymer material having a helical structure or made of an optical-angle-based color-changing cellulose material. The optical-angle-based color-changing chiral polymer material having a helical structure is obtained from condensation polymerization of a chiral compound and a compound with functional group, wherein the functional group includes hydroxy, carboxyl or amino;

The chiral compound is one or more selected from the group consisting of isosorbide, D-camphoric acid, 2,3-dihydroxy butane or 3-methyl adipic acid;

The compound with functional group is one or more selected from the group consisting of hydroquinone, triglycol, p-hydroxybenzoic acid, ethylene glycol, oxalic acid, terephthalic acid and the like, or one or more selected from the group consisting of phenol, fatty acid, formaldehyde and the like;

The composition of the optical-angle-based color-changing chiral polymer material and the process for preparation thereof are described in CN03114913.8 in detail;

The optical-angle-based color-changing cellulose material is composed of a cellulose derivative and a polymerisable monomer;

The cellulose derivative has the following structural formula:

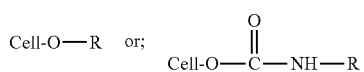

wherein, Cell is cellulose, R is C$_1$-C$_{20}$ alkyl or a derivative of phenyl;

The polymerisable monomer is one or more selected from the group consisting of acrylate, methacrylate, vinyl ether, epoxy resin or cis-butyl diacid ester;

The optical-angle-based color-changing cellulose material and the process for preparation thereof are described in CN02136974.7 in detail;

The directional retroreflective layer is composed of spheres which are made of optical material with high refractive index, preferably glass or polycarbonate and the like. The directional retroreflective layer is spherically embedded in the support layer.

After a great deal of experiments, the present inventors find out that the refractive index of the material for the directional retroreflective layer has a great influence on the characteristic of directional retroreflection. Thus in the present invention, the refractive index of the material for the directional retroreflective layer is set to 1.9-1.93, as a result the directional retroreflective characteristic is exhibited only under a certain optical condition. Further, a combination of the material for the directional retroreflective layer with the optical-angle-based color-changing material enables the optical-angle-based color-changing information in the anti-counterfeiting film to be concealed under observation by naked eyes, and exhibited only by observation under particular optical condition. Using special recognizer for observation, graphics on the surface of the anti-counterfeiting film disappears, the optical-angle-based color-changing graphics concealed therein is exhibited. When changing the viewing angle, the color of the graphics will change, for example, turn into red from green.

The special recognizer provides an optical condition for directional retroreflection, the structure of the special recognizer is a prior art as described in U.S. Pat. No. 6,019,287.

The process for preparation of the anti-counterfeiting film of the present invention comprises the following steps:

(1) Coating a release material having adhesion force over a base film, implanting the material for the directional retroreflective layer onto the release layer, then drying at 100-130° C. for 2 to 3 minutes;

The base film is selected from a transparent polymeric polyester film material, preferably is polyethylene terephthalate, polycarbonate, polystyrene or polyvinyl chloride and the like;

The release material is preferably liquid paraffin;

(2) Coating or printing the optical-angle-based color-changing information layer over the directional retroreflective layer, then vapor depositing the material for the reflective layer in high vacuum, and coating the material for the support layer over the reflective layer, drying at 100-120° C. for 3 to 5 minutes, then removing the base film and release layer to obtain the anti-counterfeiting film;

The optical-angle-based color-changing information layer can be coated via a coating technology of mesh coating, heat melting coating or blade coating, or can be printed via a printing technology of gravure printing, flexographic printing or screen printing.

The anti-counterfeiting film obtained by the above process has a special optical structure of directional retroreflection. Therefore, in case of using a technique of solid-plate-coating the optical-angle-based color-changing material, when the resultant anti-counterfeiting film is bended to a radian)(30-360°) and observed under the optical condition of directional retroreflection, the graphics on the surface of the film disappears and a special rainbow effect is exhibited.

The optical-angle-based color-changing material that is solid-plate-coated is selected from the optical-angle-based color-changing chiral polymer material having a helical structure as disclosed in CN03114913.8, or the optical-angle-based color-changing cellulose material as disclosed in CN02136974.7.

The present invention utilizes a basic principle of directional retroreflection and special optical structure in combination with novel optical-angle-based color-changing material, so as to obtain a transparent anti-counterfeiting film which has particular visual effect. The anti-counterfeiting film is unique in anti-counterfeiting feature, is transparent, has a high technological barrier, has a potent anti-counterfeiting effect, and can be widely used in the field of various top grade commodities, valuable securities and certificate and cards.

DETAILED DESCRIPTIONS OF THE PREFERRED EMBODIMENTS

Figure 1:
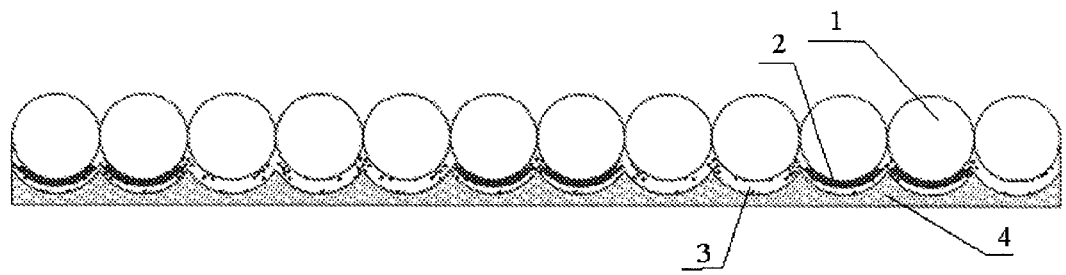
FIG. 1 is the structure profile of the anti-counterfeiting film.

See FIG. 1, the anti-counterfeiting film of the present invention comprises a directional retroreflective layer 1, an optical-angle-based color-changing information layer 2, a reflective layer 3 and a support layer 4 which are combined in this turn;

The directional retroreflective layer 1 is composed of spheres, which are made of optical material with high refractive index, preferably glass or polycarbonate and the like. The directional retroreflective layer is spherically embedded in the support layer 4, wherein the diameter of the spheres is in the range from 10 to 100 μm.

Example 1

A PET (polyethylene terephthalate) film was used as a base film, on which a liquid paraffin was coated as a release layer, then a spherical glass material having a diameter of 70 μm and a refractive index of 1.9 was implanted thereon to form a directional retroreflective layer. The resultant product was dried at 110° C. for 3 minutes, then an optical-angle-based color-changing cellulose material was printed via screen printing over the directional retroreflective layer to form an optical-angle-based color-changing information layer, wherein the composition and preparation process for the cellulose material were disclosed in Example 1 of CN02136974.7. After that, a reflective layer material ZnO was vapor deposited over the information layer in high vacuum to a thickness of 60 nm, then polyurethane used as a material for a support layer was coated over the reflective layer, followed by drying at 120° C. for 3 minutes. Then the PET (polyethylene terephthalate) base film on the surface and the release layer were removed to expose the directional retroreflective layer. As a result, an anti-counterfeiting film having the characteristic of viewing-angle-based color-change under the condition of directional retroreflection was obtained.

Figure 2:
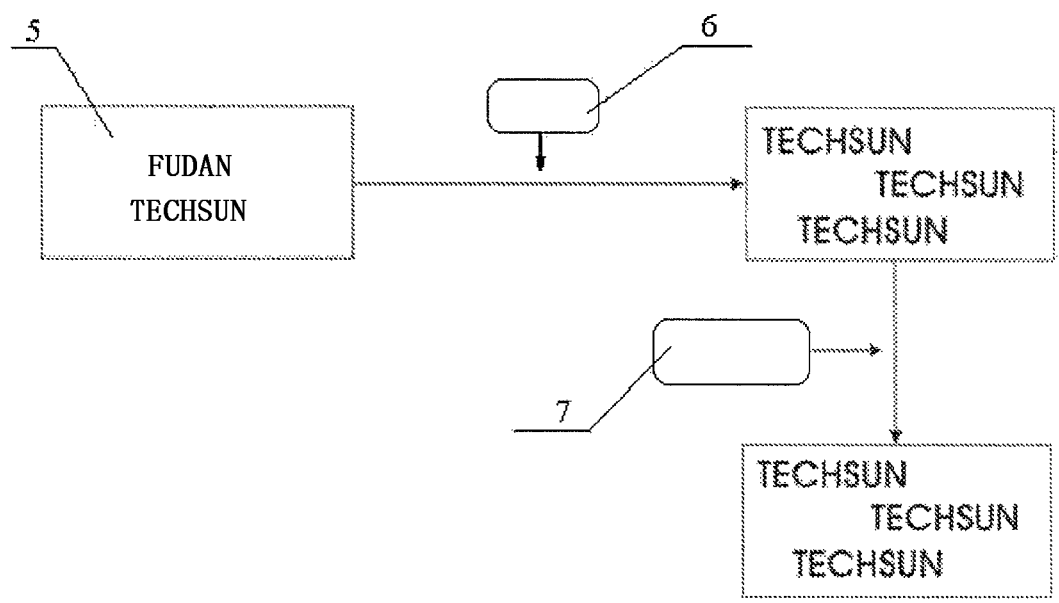
FIG. 2 is the graph of the effect of the anti-counterfeiting film.

The effect as shown in FIG. 2 was found upon observing the anti-counterfeiting film with a special recognizer reported in U.S. Pat. No. 6,019,287.

As shown in FIG. 2, the anti-counterfeiting film 5 having graphics printed on the surface was observed under the optical condition of directional retroreflection provided by the special recognizer 6 disclosed in U.S. Pat. No. 6,019,287, the graphics on the surface of the anti-counterfeiting film disappeared and the optical-angle-based color-changing graphics concealed therein exhibited. When the viewing angle was changed (corresponding to step 7), the color of the graphics changed accordingly, for example, turned into red from green.

Example 1 of CN02136974.7 disclosed the following steps:

10 g of cellulose (obtained via hydrolysis of cellulose acetate) was dissolved in 210 ml of pyridine, and the temperature was raised to reflux. After that, 50 ml of phenyl isocyanate was added, then refluxed for 48 hours. A majority of pyridine was then removed via reduced-pressure distillation, and 0.8 L of methanol was added so that a solid was precipitated. The solid was filtrated, and the resultant filter cake was dissolved in 600 ml of acetone, into which 0.8 L of methanol was further added to effect a precipitation. The precipitate was filtrated, washed and dried in vacuum to obtain 20 g product. The result of IR confirmed that, hydroxy in cellulose crystallite substantially had been esterified.

Example 2

A PET (polyethylene terephthalate) film was used as a base film, on which liquid paraffin was coated as a release layer, then a spherical glass material having a diameter of 100 μm and a refractive index of 1.93 was implanted thereon to form a directional retroreflective layer. The resultant product was dried at 100° C. for 3 minutes, then an optical-angle-based color-changing chiral polymer material was printed via flexographic printing over the directional retroreflective layer to form an optical-angle-based color-changing information layer, wherein the composition and preparation process for the chiral polymer material were disclosed in Example 1 of CN03114913.8. After that, a reflective layer material ZnS was vapor deposited over the information layer in high vacuum to a thickness of 50 nm, then polyurethane used as a material for a support layer was coated over the reflective layer, followed by drying at 100° C. for 5 minutes. Then the PET (polyethylene terephthalate) base film on the surface and the release layer were removed to expose the directional retroreflective layer. As a result, an anti-counterfeiting film having the characteristic of viewing-angle-based color-change under the condition of directional retroreflection was obtained.

The effect as shown in FIG. 2 was found upon observing the anti-counterfeiting film with a special recognizer reported in U.S. Pat. No. 6,019,287.

As shown in FIG. 2, the anti-counterfeiting film 5 having graphics printed on the surface was observed under the optical condition of directional retroreflection provided by the special recognizer 6 disclosed in U.S. Pat. No. 6,019,287, the graphics on the surface of the anti-counterfeiting film disappeared and the optical-angle-based color-changing graphics concealed therein exhibited. When the viewing angle was changed (corresponding to step 7), the color of the graphics changed accordingly, for example, turned into red from green.

Example 1 of CN03114913.8 disclosed the following steps:

13 g of p-hydroxybenzoic acid, 4 g of terephthalic acid, 1 g of hydroquinone, 2.5 g of isosorbide and 4.0 g of 3-methyl caproic acid were added into a reactor, then 40 ml of acetic anhydride was further added. The system was stirred mechanically under the protection of nitrogen atmosphere and heated to reflux. The system temperature was 150° C. and retained for 30 min. Evaporation of water and acetic acid was observed, and, the reaction temperature was raised gradually to 300° C. and retained for 30 min. Once no liquid was evaporated, the system was subjected to reduced-pressure distillation, during which the vacuum degree was raised continuously to 10 mbar, then retained at 10 mbar for 30 min. The viscosity of the system was found to increase, and the color turned into dark. The system was stirred more vigorously, and retained at high vacuum and high-temperature for 30 min, as a result the reactant turned to blue. Then the temperature was decreased slowly, and the pressure was recovered to normal pressure. The color of the material was fixed as blue slowly. The material was taken out to obtain the product.

Example 3

A PET (polyethylene terephthalate) was used as a base film, on which liquid paraffin was coated as a release layer, then a spherical glass material having a diameter of 60 μm and a refractive index of 1.9 was implanted thereon to form a directional retroreflective layer. After drying, an optical-angle-based color-changing cellulose material (the optical-angle-based color-changing material as disclosed in Example 1 of CN02136974.7) was coated via mesh coating over the directional retroreflective layer, to form a solid-plate optical-angle-based color-changing layer. After that, a reflective layer material ZnS was vapor deposited in high vacuum to a thickness of 20 nm, then polyurethane used as a material for a support layer was coated over the reflective layer. After drying, the PET (polyethylene terephthalate) base film on the surface and the release layer were removed to expose the directional retroreflective layer. As a result, an anti-counterfeiting film having the characteristic of viewing-angle-based color-change under the condition of directional retroreflection was obtained.

Figure 3:
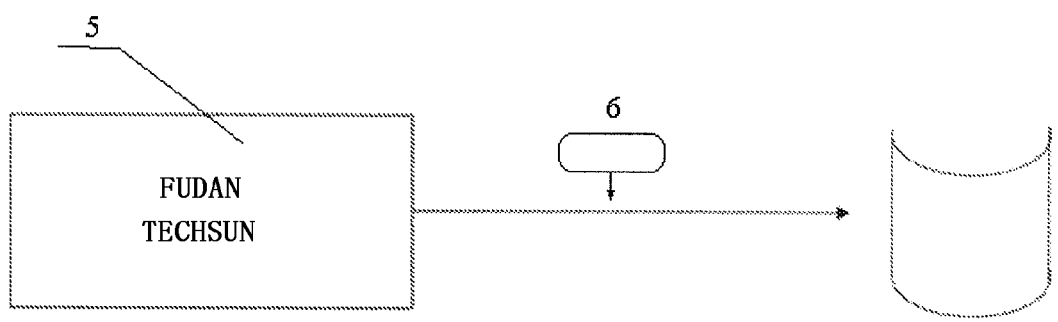
FIG. 3 is the rainbow effect upon bending the anti-counterfeiting film to radian.

As shown in FIG. 3, when the anti-counterfeiting film 5 was bended into a radian of 60° and observed with a special recognizer 6 reported in U.S. Pat. No. 6,019,287, a special rainbow effect was exhibited.

Example 1 of CN02136974.7 disclosed the following steps:

10 g of cellulose (obtained via hydrolysis of cellulose acetate) was dissolved in 210 ml of pyridine, and the temperature was raised to reflux. After that, 50 ml of phenyl isocyanate was added, then refluxed for 48 hours. A majority of pyridine was then removed via reduced-pressure distillation, and 0.8 L of methanol was added so that a solid was precipitated. The solid was filtrated, and the resultant filter cake was dissolved in 600 ml of acetone, into which 0.8 L of methanol was further added to effect a precipitation. The precipitate was filtrated, washed and dried in vacuum to obtain 20 g product. The result of IR confirmed that, hydroxy in cellulose crystallite substantially had been esterified.

The invention claimed is:

1. An anti-counterfeiting film, comprising a directional retroreflective layer, an optical-angle-based color-changing information layer, a reflective layer and a support layer:
   the support layer is made of a polymer resin material;
   the reflective layer is made of a material having a high reflectivity and a thickness on a nanoscale;
   the optical-angle-based color-changing information layer is made of an optical-angle-based color-changing chiral polymer material having a helical structure or of an optical-angle-based color-changing cellulose material, the optical-angle-based color-changing chiral polymer material having a helical structure is a condensation product of a chiral compound and a compound with a functional group;
   the optical-angle-based color-changing cellulose material is composed of a cellulose derivative and a polymerisable monomer;
   the directional retroreflective layer is composed of spheres which are made of optical material, and, the directional retroreflective layer is spherically embedded in the support layer; and the refractive index of the material for the directional retroreflective layer is 1.9-1.93.

2. The anti-counterfeiting film according to claim 1, wherein the polymer resin material for the support layer is selected from the group consisting of polyurethane, phenolic resin and polyacrylic acid resin.

3. The anti-counterfeiting film according to claim 1, wherein the reflective layer is selected from the group consisting of ZnO, SnO, ZnS and $TiO_2$.

4. The anti-counterfeiting film according to claim 1, wherein the chiral compound is selected from the group consisting of isosorbide, D-camphoric acid, 2,3-dihydroxy butane and 3-methyl adipic acid;

the compound with a functional group is selected from the group consisting of hydroquinone, triglycol, p-hydroxybenzoic acid, ethylene glycol, oxalic acid, terephthalic acid, phenol, fatty acid and formaldehyde;

the cellulose derivative has the following structural formula:

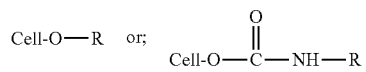

wherein, Cell is cellulose, R is $C_1$-$C_{20}$ alkyl or derivatives of phenyl;

the polymerisable monomer is selected from the group consisting of acrylate, methacrylate, vinyl ether, epoxy resin and cis-butyl diacid ester.

5. A process for preparation of the anti-counterfeiting film comprising the following steps:

coating a release material having adhesion force over a base film, implanting material for a directional retroreflective layer onto the release layer, followed by drying; and coating or printing an optical-angle-based color-changing information layer over the directional retroreflective layer, then vapor depositing material for a reflective layer in a high vacuum, and coating material for a support layer over the reflective layer, followed by drying, then removing the base film and release layer to obtain the anti-counterfeiting film.

6. The process of claim 5, wherein the coating step uses a technology selected from the group consisting of mesh coating, heat melting coating and blade coating is used for the coating.

7. The process of claim 5, wherein the base film is selected from a transparent polymeric polyester film material.

8. The process of claim 7, wherein the base film is selected from the group consisting of polyethylene terephthalate, polycarbonate, polystyrene and polyvinyl chloride.

9. The process of claim 5, wherein the release material is liquid paraffin.

10. The process of claim 5, wherein the printing step uses a technology selected from the group consisting of gravure printing, flexographic printing and screen printing is used for the printing.

* * * * *